US007612137B2

(12) United States Patent
Brinkmann et al.

(10) Patent No.: US 7,612,137 B2
(45) Date of Patent: Nov. 3, 2009

(54) SURFACE-MODIFIED SILICA GELS

(75) Inventors: Ulrich Brinkmann, Mörstadt (DE);
Christian Götz, Bonn (DE);
Hans-Dieter Christian, Alzenau (DE)

(73) Assignee: Degussa AG, Duesseldorf (DE)

( * ) Notice: Subject to any disclaimer, the term of this patent is extended or adjusted under 35 U.S.C. 154(b) by 561 days.

(21) Appl. No.: 11/132,293

(22) Filed: May 19, 2005

(65) Prior Publication Data
US 2005/0282934 A1 Dec. 22, 2005

(30) Foreign Application Priority Data
Jun. 16, 2004 (DE) ............ 10 2004 029 069

(51) Int. Cl.
*C08K 3/34* (2006.01)
(52) U.S. Cl. ............ 524/492; 106/287.13; 106/287.14; 106/287.16; 106/490; 524/493
(58) Field of Classification Search ............ 106/287.13, 106/287.14, 287.16, 490; 524/492, 493
See application file for complete search history.

(56) References Cited

U.S. PATENT DOCUMENTS

| 5,256,196 | A | 10/1993 | Chjonowski et al. |
| 5,321,070 | A | 6/1994 | Meier et al. |
| 5,750,610 | A | * 5/1998 | Burns et al. ............ 524/434 |
| 5,851,502 | A | 12/1998 | Turk et al. |
| 6,077,466 | A | 6/2000 | Turk et al. |
| 6,191,122 | B1 | 2/2001 | Lux et al. |
| 6,846,865 | B2 | 1/2005 | Panz et al. |
| 6,899,951 | B2 | 5/2005 | Panz et al. |
| 6,956,080 | B2 | 10/2005 | Scholz et al. |
| 7,022,375 | B2 | 4/2006 | Schachtely et al. |
| 7,074,457 | B2 | 7/2006 | Panz et al. |
| 7,204,969 | B2 | 4/2007 | Kuhlmann et al. |
| 7,220,449 | B2 | 5/2007 | Schachtely et al. |
| 2005/0191228 | A1 | 9/2005 | Panz et al. |
| 2005/0192395 | A1 | 9/2005 | Panz et al. |
| 2007/0286788 | A1 | 12/2007 | Panz et al. |
| 2007/0299203 | A1 | 12/2007 | Panz et al. |
| 2008/0173739 | A1 | 7/2008 | Meier et al. |

OTHER PUBLICATIONS

U.S. Appl. No. 12/262,684, filed Oct. 31, 2008, Panz, et al.
U.S. Appl. No. 11/944,851, filed Nov. 26, 2007, Panz, et al.
U.S. Appl. No. 60/021,601, filed Jul. 11, 1996, Oelmueller, et al.
U.S. Appl. No. 09/447,044, filed Nov. 23, 1999, Turk, et al.
U.S. Appl. No. 08/683,342, filed Jul. 18, 1996, Rausch, et al.
U.S. Appl. No. 60/940,615, filed May 29, 2007, Meier, et al.
U.S. Appl. No. 60/985,809, filed Nov. 6, 2007, Panz, et al.

* cited by examiner

*Primary Examiner*—Edward J Cain
(74) *Attorney, Agent, or Firm*—Oblon, Spivak, McClelland, Maier & Neustadt, L.L.P.

(57) ABSTRACT

The invention relates to surface-modified silica gels, to a process for preparing them, and to their use as matting agents in coating materials. As a result of the nature of the surface modification, the viscosity of 2-component coating materials is increased only slightly, or not at all, after the matting agent has been added.

47 Claims, No Drawings

SURFACE-MODIFIED SILICA GELS

The present invention relates to new surface-modified silica gels, to a process for preparing them, and to their use.

Silica gels are inorganic oxides based on $SiO_2$. A distinction is made between hydrogels, aerogels and/or xerogels. Hydrogels—or else aquagels—are prepared in water, and so their pores are filled with water. A xerogel is a hydrogel from which the water has been removed. An aerogel is a xerogel from which the liquid has been removed in such a way that there is only minimal change to the structure of the gel and the pore volume is largely retained.

Silica gels have been known for a long time (Iler, "Chemistry of Silica", p. 462 ff, 1979). They are prepared under conditions which promote coalescence of primary particles (average particle size: 1 to 10 nm), so that in contrast to precipitated or pyrogenic silicas a relatively rigid, three-dimensional network is formed. Consequently silica gel particles differ distinctly from precipitated silica particles.

The preparation of silica gels is well known to the skilled worker; see, for example, U.S. Pat. No. 4,097,302, DE 41 32 230, and EP 0 384 226. It involves mixing sodium silicate and sulfuric acid with one another rapidly and continuously at low temperatures, low pH, and high concentrations, to form a hydrosol, which in turn, after a short time, is condensed to the hydrogel. Alternatively the gelling can also take place under alkaline conditions (see, for example, GB 1,219,877, GB 1,279,250, WO98 25 851 or EP 0 588 497). A further alternative is proposed in EP 0 765 764.

The resultant hydrogel is broken into relatively small pieces and washed to remove soluble salts and impurities. During the washing cycle the pore structure of the hydrogel is adjusted by varying pH (e.g., adding bases such as ammonia, for example), temperature, and time. The procedure is well known to the skilled worker. Examples can be found in EP 0 384 226 or WO00 002 814, for instance.

Following the washing cycle the washed hydrogel is dried by thermal means in order to form a silica gel or xerogel. The nature and mode of drying have a substantial influence on the pore volume of the silica gel. With rapid drying the pore volume can be very largely maintained; in the case of slow drying, the pore volume reduces. Finally the silica gel can be ground or comminuted to a specific particle size and particle distribution.

It is state of the art to use synthetic or natural materials in fine-particle form as matting agents in various applications such as, for example, industrial coatings, leather coatings and plastics coatings or in printing inks. Matting agents ideally possess the following properties: high pore volume, narrow particle distribution, suitable particle size tailored to the respective application, and narrow pore distribution. Featuring, as they do, the majority of the properties indicated above, precipitated silicas and silica gels are the product normally used as matting agents.

Besides the advantage of reducing the gloss of coatings, however, the use of matting agents in coatings also leads to problems. For instance, in certain coating systems, the addition of the matting agent undesirably increases their viscosity. As described in EP 0 442 325, particularly thixotropic, conventional solventborne alkyd coatings are difficult to matt in light of their rheological properties. This relates in particular to aqueous coating systems based on acrylate or acrylate-polyurethane, or corresponding hybrid systems.

A further problem frequently observed with matting agents is that they have a propensity towards sedimentation. In order to prevent matting agents sedimenting in coatings, the surface of the majority of commercially customary matting agents is coated with a surface modifier. Here, organic components are attached to the $SiO_2$ surface. This attachment may be chemical, so that true chemical bonds exist between $SiO_2$ surface and organic component, and may also be physical, i.e., the organic component is adsorbed onto the $SiO_2$ surface by means of Van der Waals interactions or hydrogen bonds. Surface modification, however, carries problems in its wake. Thus commercially customary, surface-modified matting agents often have the disadvantage that during storage of the coating material the coating may become detached and hence the desired effect is at least partly annulled again. This can lead to impairments of the coating properties.

The document WO2003 42293 discloses a matting agent where a silica gel has been coated with wax. WO99 51692 proposes coating the silica gel with a urea-urethane derivative.

Coating a silica gel with a polyol in accordance with patent EP 0 442 325 produces a matting agent which has very little effect, if any, on the thixotropic behavior of inks and coating materials based on polyamide-modified alkyd resins.

Patent WO98 37013 describes a process in which a hydrogel is contacted with an organosiloxane in the presence of a catalytic amount of a strong acid, so that the hydrogel is converted into a hydrophobicized silica gel. Compounds having the general structure $R_nSiO_{(4-n)/2}$ where n=2-3 are used as organosiloxane.

It was an object of the present invention to provide surface-modified silica gels for which at least some of the aforementioned disadvantages have been eliminated, at least in part, and which exhibit improved performance properties. A further aim is to provide a process with which the surface-modified silica gels of the invention can be prepared.

Further objects, not explicitly mentioned, arise from the overall context of the subsequent description and examples.

Surprisingly it has been found that the object is achieved by means of the surface-modified silica gels of the invention, defined in more detail in the following description and also in the claims and the examples, and by means of the process described in more detail in the description, the examples, and the claims.

The present invention provides surface-modified silica gels which influence the viscosity of a 2-component reference varnish, containing 10.7% by weight of at least one inventively surface-modified silica gel and stored, following preparation and addition of the surface-modified silica gel, at 23° C. and 50% relative humidity (RH) for 1 day, in such a way that the thixotropic index TI 6/60 is less than or equal to 4.5.

The invention further provides surface-modified silica gels which additionally increase the viscosity of the 2-component reference varnish containing 10.7% by weight of at least one inventively surface-modified silica gel and stored, following preparation and addition of the surface-modified silica gel, at 23° C. and 50% RH for 1 day, in the low-shear state to a maximum of 1200 mPa*s and, moreover, may be characterized by one or more of the following physicochemical parameters:

| | |
|---|---|
| average particle size $d_{50}$: | 0.5-50 μm |
| DBP: | 100-600 g/100 g |
| BET: | 100-1000 m$^2$/g |
| Carbon content: | 0.5-20% |
| Pore volume (2-50 nm): | >1.0 ml/g |
| Span: | <1.3. |

Likewise provided by the present invention is a process with which the surface-modified silica gels of the invention can be prepared and which comprises modifying the surface of the silica gel with a polymer.

The invention provides, finally, for the use of the surface-modified silica gels of the invention, particularly as matting agents in inks and paints.

The surface-modified silica gels of the invention have the following advantages, among others, over commercially customary matting agents based on $SiO_2$:

- As compared with commercially customary matting agents based on $SiO_2$, the surface-modified silica gels of the invention produce a significantly lower increase in the viscosity of the matted coating material for the same matting efficiency.
- The surface-modified silica gels of the invention have a very low propensity towards sedimentation in coated materials. In this quality, therefore, they exhibit distinct advantages over similar matting agents that are coated with waxes.
- In certain coating systems the surface-modified silica gels of the invention produce better transparency than commercially customary matting agents based on $SiO_2$.

The present invention is described in detail below. To start with, however, a number of important terms are defined.

Silica gels for the purposes of the present invention are inorganic oxides based on $SiO_2$ which are prepared via a gel process. Silica gels subdivide into the group of the hydrogels, the aerogels, and the xerogels. Hydrogels—or else aquagels—are prepared in water and so their pores are filled with water. A xerogel is a hydrogel from which the water has been removed. An aerogel is a xerogel from which the liquid has been removed in such a way that there is only minimal change to the structure of the gel and the pore volume is largely retained.

By surface modification is meant the chemical and/or physical attachment of organic components to the surface of the silica gels. In other words, in surface-modified silica gels, at least part of the surface of at least some of the silica gel particles is coated with the surface modifier.

A low-shear state corresponds to the dynamic viscosity measured by means of a Haake viscometer 6R at 6 rpm at room temperature. High-shear state corresponds to the dynamic viscosity measured by means of a Haake viscometer 6R at 60 rpm at room temperature.

Thixotropic index is the ratio of the dynamic viscosity of the 2-component reference varnish containing 10.7% by weight of at least one surface-modified silica gel of the invention and stored, following preparation and addition of the surface-modified silica gel, at 23° C. and 50% RH for 1 day, in the low-shear state to the dynamic viscosity of the 2-component reference varnish containing 10.7% by weight of at least one of the surface-modified silica gels of the invention and stored, following preparation and addition of the surface-modified silica gel, at 23° C. and 50% RH for 1 day, in the high-shear state:

$$TI\ 6/60 = \frac{\text{dynamic viscosity at 6 rpm}}{\text{dynamic viscosity at 60 rpm}}$$

The 2-component reference varnish used for the purposes of the invention is a 2-component varnish prepared in accordance with the coating formula 2 described in this patent.

The surface-modified silica gels of the invention are gels which influence the viscosity of a 2-component reference varnish, containing 10.7% by weight of at least one inventively surface-modified silica gel and stored, following preparation and addition of the surface-modified silica gel, at 23° C. and 50% relative humidity (RH) for 1 day, in such a way that the thixotropic index TI 6/60 is less than or equal to 4.5, preferably less than or equal to 4.0, in particular not more than 3.8.

The surface-modified silica gels of the invention may additionally be gels which increase the viscosity of the 2-component reference varnish, containing 10.7% by weight of at least one inventively surface-modified silica gel and stored, following preparation and addition of the surface-modified silica gel, at 23° C. and 50% RH for 1 day, in the low-shear state to a maximum of 1200 mPa*s, preferably to a maximum of 900 mPa*s, in particular to a maximum of 700 mPa*s, in one particular embodiment to a maximum of 650 mPa*s, and in one very particularly preferred embodiment to a maximum of 600 mPa*s.

The surface-modified silica gels of the invention may also have one or more of the following physicochemical parameters:

| | |
|---|---|
| average particle size $d_{50}$: | 0.5-50 μm |
| DBP: | 100-600 g/100 g |
| BET surface area: | 100-1000 m$^2$/g |
| Carbon content: | 0.5-20% |
| Mesopore volume (2-50 nm): | >1.0 ml/g |
| Span: | <1.3. |

In particular they may have

- an average particle size $d_{50}$ preferably of 1 μm to 40 μm, more preferably of 1 μm to 20 μm, in particular of 2 μm to 15 μm and/or
- a DBP absorption preferably of 150 to 500 g/100 g, more preferably of 200 to 500 g/100 g, in particular of 200 to 400 g/100 g and 200 to 300 g/100 g and/or
- a BET surface area preferably of 150 to 750 m$^2$/g, more preferably of 200 to 500 m$^2$/g and 200-350 m$^2$/g and/or
- a carbon content preferably of 0.5% to 15%, more preferably of 0.5% to 10% and in particular 1% to 6%, 2% to 6% and 3-5%,
- a mesopore volume (2-50 nm) preferably of >1.5 ml/g and/or a span of 0.1-1.2.

The sedimentation behavior of the surface-modified silica gels of the invention is generally 1 to 2 (for details relating to the method, see example 6).

All stated ranges of preference may be set independently of one another.

The particular properties of the silica gels of the invention can be attributed in particular to the polymers used for the surface modification. Silica gels which exhibit the properties according to the invention preferably have a surface which has been treated with one or more polyorganosiloxanes or modified polyorganosiloxanes. With particular preference the silica gels involved are silica gels which have been treated with polyether-, acrylate- and/or polyacrylate-modified polyorganosiloxanes or polyalkoxysiloxanes.

In one particularly preferred embodiment of the present invention the silica gels have a surface coated with polyorganosiloxanes of the following general structure:

$$Y-\underset{R}{\overset{R}{\underset{|}{Si}}}-O-\left[\underset{R}{\overset{R}{\underset{|}{Si}}}-O\right]_a\left[\underset{\underset{\underset{Y}{|}}{\underset{R^2-Si-R^2}{\underset{|}{O}}}}{\overset{R}{\underset{|}{Si}}}-O\right]_b\left[\underset{R}{\overset{R}{\underset{|}{Si}}}-O\right]_c\underset{R}{\overset{R}{\underset{|}{Si}}}-Y$$

where
Y = —OH, —OR or
Y = $H_5C_2$—O—$(C_2H_4O)_m$—, $H_7C_3$—O—$(C_3H_6O)_m$— or
Y = $R_2C\!=\!\underset{\underset{COOR^3}{|}}{\overset{\overset{|}{R^4}}{C}}-(CH_2-CH)_k-$, R = -alkyl, especially methyl or ethyl,
$R^2$ = alkyl or H,
$R^3$ = alkyl,
$R^4$ = H or alkyl,
a = 0-100, b = 0-100, c = 0-100, d = 0-100,
m = 0-100 and k = 0-100.

In a further preferred embodiment of the present invention the surface of the silica gels is coated with a polyorganosiloxane of the following general structure:

$$R^1-\underset{CH_3}{\overset{CH_3}{\underset{|}{Si}}}-O-\left(\underset{R^1}{\overset{CH_3}{\underset{|}{Si}}}-O\right)_a\left(\underset{\underset{\underset{R^1}{|}}{\underset{CH_3-Si-CH_3}{\underset{|}{O}}}}{\overset{\overset{CH_3}{|}}{\underset{|}{Si}}}-O\right)_b\left(\underset{R^1}{\overset{CH_3}{\underset{|}{Si}}}-O\right)_a\underset{CH_3}{\overset{CH_3}{\underset{|}{Si}}}-R^1$$

where
$R_1$ = a methyl radical or
$R_1$ = $(CH_3)_2CH\underset{\overset{||}{O}}{C}OCH_2\underset{\overset{|}{O}}{C}(CH_3)_2CHCH(CH_3)_2$ and/or
$R_1$ = $(CH_3)_2CH\underset{\overset{||}{O}}{C}OCHC(CH_3)_2CH_2O-$
$\phantom{R_1 = (CH_3)_2CHCOCH}\underset{\underset{CH_3}{|}}{\overset{|}{CH}}-CH_3$ and the sum of the units a=0 to 100, the sum of the units b=0 to 15, the ratio of methyl to alkoxy radicals $R^1$ being less than 50:1, and b>1 if a=0 and a>5 if b=0. Further details, relating in particular to the preparation of these polyorganosiloxanes, can be found in DE 36 27 782 A1. The content of that patent application is likewise subject matter of the present specification.

The term "alkyl radical" embraces straight-chain and branched-chain alkyl radicals having 1 to 100 carbon atoms, preferably 1 to 25, more preferably 1 to 10 carbon atoms, and also cycloalkyl radicals having 1 to 15 carbon atoms. The alkyl radicals may contain one or more double or triple bonds and individual atoms may be replaced by heteroatoms such as O, N or S.

The surface-modified silica gels of the invention can be prepared by a process in which the surface of the silica gel is modified with a polymer.

The processes of the invention comprise the following steps:
a) preliminary grinding of the hydrogel
b) drying of the hydrogel to give the xerogel
c) grinding of the xerogel
and
d) surface modification;

step d) can be carried out at different points in time.

In step a) a hydrogel prepared by conventional processes is given a coarse preliminary grinding for further processing. All kinds of mills are suitable for preliminary grinding, preference being given to the use of pinned-disk mills. Hydrogels which have proven particularly suitable for the process of the invention are hydrogels having an $SiO_2$ content of $\geq 5\%$, preferably 20% to 40%, and a BET of 200 to 500 m²/g, preferably of 250 to 400 m²/g. Hydrogels of this kind can be prepared, for example, in accordance with EP 0 384 226 or DE 41 32 230. The content of those patents is expressly incorporated into the content of the present invention.

In step b) the preground hydrogel is dried. For the use of silica gels as matting agents a high pore volume has proven advantageous, since it allows low gloss levels to be achieved in the coating material. A high pore volume can be obtained by subjecting the hydrogel to short-duration drying. Drying units which have proven suitable include, for example, spray dryers, grinding dryers, pneumatic dryers or spin-flash dryers. For the process of the invention, drying is carried out preferably in a spin-flash dryer, with a chosen dryer entry temperature in the range 100-700° C., preferably 100-500° C. and more preferably 300-500° C. Throughput and exit temperature are adjusted such that the resultant xerogel has a residual moisture content of <15%, preferably <10%.

After drying, the silica gel is ground in step c). All kinds of mills are suitable for this purpose. Air-jet and steam-jet mills have proven particularly suitable for the degree of fine division required in the product for use as a matting agent. With particular preference, grinding is carried out on a fluidized-bed opposed-jet mill.

In order to avoid oversize or bits it is advantageous, after the drying of the surface-modified silica gels in step b) or after or during the grinding in step c), to separate off particles having a diameter of more than 50 μm, preferably more than 30 μm, in particular more than 20 μm. Depending on the fineness of the matting agent, this may take place by means, for example, of an appropriate screen or classifier device, which may also be integrated in the mill.

The surface modification in step d) can take place before or during at least one of steps a) to c). The polymer may be added in pure, undiluted form or in dilute form as an aqueous emulsion.

In an embodiment I of the present invention—step d) before step b)—0.2% to 12% by weight, preferably 0.5% to 5% of the polymer, based on the hydrogel, are mixed intensively with the preground hydrogel (after step a)) at room temperature. The addition is made in such a way as to ensure homogeneous distribution via the hydrogel. Subsequently the mixture is dried in step b), ground in step c) and, where appropriate, screened or classified.

In an embodiment II of the present invention—step d) before step c)—the silica gel dried in step b), with a residual moisture content of $\leq 10\%$, is mixed intensively with the polymer at room temperature. The polymer is added in such a way as to ensure homogeneous distribution via the hydrogel. Subsequently the mixture, in step c), is ground and where appropriate is screened or classified.

In an embodiment III of the present invention—step d) during c)—the silica gel dried in step b) is ground in step c) and at the same time the surface is modified. For this purpose the polymer is conveyed into the grinding chamber of the mill at a rate which allows the desired coating ratio to be set.

The unmodified silica gel precursors used in stages a)-c), depending on the particular embodiment of the process of the invention, can be prepared by known processes or obtained commercially. From this it is apparent that, on the one hand, the surface modification step d) can be integrated as an additional step into known processes for preparing silica gels, but that, on the other hand, it is also possible to obtain silica gel precursors which can be used as starting material for one of process variants I-III.

Surface-modifying polymers which can be used in the process of the invention are polyorganosiloxanes or modified polyorganosiloxanes. The modified polyorganosiloxanes are, in particular, polyether-modified and acrylate- or polyacrylate-modified polyorganosiloxanes. Polyalkoxysiloxanes can also be used.

One particularly preferred embodiment of the process of the invention uses polyorganosiloxanes having the following general structure:

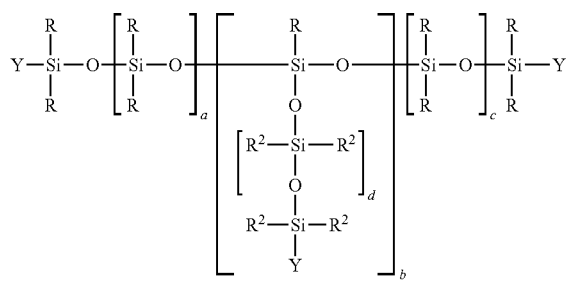

where
Y = —OH, —OR or
Y = $H_5C_2$—O—$(C_2H_4O)_m$—, $H_7C_3$—O—$(C_3H_6O)_m$— or
Y = $R_2C$=C—$(CH_2$—$CH)_k$—,
      |        |
      $R^4$   $COOR^3$
R = -alkyl, especially methyl or ethyl,
$R^2$ = alkyl or H,
$R^3$ = alkyl,
$R^4$ = H or alkyl,
a = 0-100, b = 0-100, c = 0-100, d = 0-100,
m = 0-100 and k = 0-100.

A further preferred embodiment of the process of the invention uses polyorganosiloxanes having the following general structure:

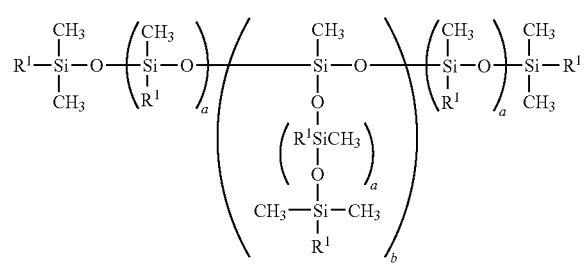

where
$R_1$ = a methyl radical or
$R_1$ = $(CH_3)_2CHCOCH_2C(CH_3)_2CHCH(CH_3)_2$
          ||                    |
          O                     O
                                | and/or
$R_1$ = $(CH_3)_2CHCOCHC(CH_3)_2CH_2O$—
          || |
          O  CH—$CH_3$
             |
             $CH_3$ and the sum of the units a=0 to 100, the sum of the units b=0 to 15, the ratio of methyl to alkoxy radicals $R^1$ being less than 50:1, and b>1 if a=0 and a>5 if b=0. Further details, relating in particular to the preparation of these polyorganosiloxanes, can be found in DE 36 27 782 A1. The content of that patent application is likewise subject matter of the present specification.

In the process of the invention the nature and amount of the polymer are chosen such that the surface-modified silica gel increases the viscosity of the 2-component reference varnish containing 10.7% by weight of the surface-modified silica gel in the low-shear state to a maximum of 1200 mPa*s, preferably to a maximum of 900 mPa*s, in particular to a maximum of 700 mPa*s, and in one particular embodiment to a maximum of 600 mPa*s.

The surface-modified silica gels of the invention are used preferably as matting agents in inks and paints.

In addition the surface-modified silica gels of the invention can be used in all fields of application in which silica gels are normally used, such as, for example, as a constituent of paper coatings, as a constituent of defoamer formulations, as a reinforcing agent in silicone rubber, or in polymer formulations, as antiblocking agents, for example.

The physicochemical data of the surface-modified silica gels of the invention are determined by the following methods:

Determination of BET Surface Area

The BET surface area of silica gels is determined on the basis of DIN ISO 9277 by means of the nitrogen adsorption method of Brunauer, Emmett and Teller (BET). The method is based on the work of S. Brunauer, P. H. Emmett and E. Teller, J. Am. Chem. Soc., 60, 309 (1938).

The measurements are made on the Tristar 3000 instrument (Micromeritics). The samples under analysis are degassed under vacuum (p<$10^{-3}$ mbar) at 160° C. prior to measurement until the pressure over the sample under a closed vacuum remains constant for 30 minutes.

Determination of Mesopore Volume

The mesopore distribution is determined by the method of Barret, Joyner and Halenda (BJH) and is based on work by E. P. Barret, L. G. Joyner and P. H. Halenda, J. Am. Chem. Soc., 73, 373, (1951).

The measurements are made on the ASAP 2400 instrument (Micromeritics). The samples under analysis are degassed under vacuum (p<$10^{-3}$ mbar) at 200° C. prior to measurement until the pressure over the sample under a closed vacuum remains constant for 30 minutes.

Determination of Tapped Density

The tapped density is determined on the basis of DIN EN ISO 787-11.

A defined amount of a sample which has not been sieved beforehand is introduced into a graduated glass cylinder and subjected to a fixed number of jolts by means of a jolting volumeter. The jolting is accompanied by compaction of the sample. The result of the analysis conducted is the tapped density.

The measurements are carried out on a jolting volumeter with counter from Engelsmann, Ludwigshafen, Germany, type STAV 2003.

First of all a 250 ml glass cylinder is tared on a precision balance. Then 250 ml of silica gel are introduced with the aid of a powder funnel into the tared graduated cylinder in such a way that no cavities are formed. Subsequently the sample quantity is weighed to an accuracy of 0.01 g. Thereafter the cylinder is tapped lightly so that the surface of the powder of the cylinder is horizontal. The graduated cylinder is inserted into the corresponding holder on the jolting volumeter and jolted 1250 times. The volume of the jolted sample is read off to an accuracy of 1 ml after one jolting process. The tapped density D(t) is calculated as follows:

$$D(t)=m*1000/V$$

where:

D(t): tapped density [g/l]
V: volume of silica gel after jolting [ml]
m: mass of silica gel [g]

Determination of Loss on Drying

The moisture content or loss on drying (LD) of silica gels is determined on the basis of ISO 787-2 after 2-hour drying at 105° C. This loss on drying is accounted for predominantly by aqueous moisture.

10 g of the pulverulent silica gel are weighed to an accuracy of 0.1 mg (initial mass E) into a dry glass beaker on a precision balance (Sartorius LC621S). The glass beaker is covered with aluminum foil into which a number of holes (Ø 1 mm) have been drilled. The glass beaker covered in this way is dried in a drying oven at 105° C. for 2 h. Thereafter the hot glass beaker is cooled to room temperature in a desiccator over siccatives for at least one hour.

In order to determine the final mass A, the glass beaker is weighed to an accuracy of 0.1 mg on the precision balance. The moisture content (LD) in % is determined in accordance with $$LD=(1-A/E)*100,$$

where A=final mass in g and E=initial mass in g.

Determination of Loss on Ignition

According to this method the weight loss of silica gels is determined on the basis of DIN EN ISO 3262-1 at 1000° C. At this temperature, physically and chemically bound water and other volatile constituents escape. The moisture content (LD) of the sample investigated is determined by the above-described method "Determination of loss on drying" based on DIN EN ISO 787-2.

0.5 g of silica gel is weighed to an accuracy of 0.1 mg (initial mass E) into a tared porcelain crucible which has been calcined beforehand. The sample is heated in a muffle furnace at 1000±50° C. for 2 h. The porcelain crucible is subsequently cooled to room temperature in a desiccator cabinet with silica gel as siccative. The final mass A is determined gravimetrically.

The loss on ignition, LOI, in % is obtained in accordance with $$LOI=(1-A/F)*100$$

where F is the corrected initial mass, based on dry matter, in g, and is calculated according to $$F=E*(1-LD/100).$$

In the calculations, A=final mass in g, E=initial mass in g, and LD=loss on drying, in %.

Determination of pH

The method, based on DIN EN ISO 787-9, is used for determining the pH of an aqueous suspension of silica gel at 20° C.

Prior to pH measurement, the pH meter (Knick, type: 766 pH meter Calimatic with temperature sensor) and the pH electrode (combination electrode from Schott, type N7680) must be calibrated, using the buffer solutions, at 20° C. The calibration function is to be chosen such that the two buffer solutions used include the expected pH of the sample (buffer solutions of pH 4.00 and 7.00, pH 7.00 and pH 9.00 and, where appropriate, pH 7.00 and 12.00).

5.00 g of pulverulent silica gel with a moisture content of 4±2% are weighed to an accuracy of 0.01 g on a precision balance into a wide-necked glass bottle which has been tared beforehand. The suspension is made up to the mark using cold, deionized water at 20° C. If the samples under investigation are not sufficiently wettable by water, then the suspension is made up to the 100 ml mark using 50.0 ml of analytical-grade methanol and 50.0 ml of deionized water. Subsequently the suspension is shaken in a sealed vessel for a period of 5 minutes using a shaker machine (Gerhardt, Model LS10, 55 W, level 7) at 20° C. The pH is measured directly thereafter. For the measurement, the electrode is rinsed first with deionized water and then with a portion of the suspension, and is subsequently immersed into the suspension. A magnetic stirrer bar is then added to the suspension and pH measurement is carried out at constant stirring speed, with a slight vortex being formed in this suspension. When the pH meter displays a constant value, the pH is read off on the display.

Determination of DBP Number

The DBP absorption (DBP number), which is a measure of the absorbency of the silica gel, is determined on the basis of the DIN 53601 standard, as follows:

12.50 g of pulverulent silica gel (moisture content 4±2%) are introduced into the kneader chamber (article number 279061) of the Brabender absorptometer "E" (without damping of the outlet filter of the torque sensor). With continuous mixing (kneader paddles rotating at a speed of 125 rpm), dibutyl phthalate is added dropwise to the mixture at a rate of 4 ml/min at room temperature by means of the Brabender T 90/50 Dosimat. Its incorporation by mixing takes place with only a small amount of force, and is monitored by means of the digital display. Toward the end of the determination the mixture becomes pasty, which is indicated by a sharp increase in the required force. At a display reading of 600 digits (torque of 0.6 Nm), an electrical contact shuts off both the kneader and the DBP feed. The synchronous motor for the DBP feed is coupled to a digital counter, so that the consumption of DBP in ml can be read off.

The DBP absorption is expressed in g/100 g and is calculated using the following formula:

$$DBP = \frac{V*D*100}{E} * \frac{g}{100\ g} + K$$

where DBP=DBP absorption in g/100 g
V=consumption of DBP in ml
D=density of DBP in g/ml (1.047 g/ml at 20° C.)
E=initial mass of silica gel in g
K=correction value as per table 1 (moisture correction table) in g/100 g The DBP absorption is defined for anhydrous, dried silica gel. When moist silica gels are used it is necessary to take into account the correction value K for calculating the DBP absorption. This value can be determined using table 1; for example, a silica gel having a water content of 5.8% would mean an addition of 33 g/100 g for the DBP absorption. The moisture content of the silica gel is determined in accordance with the "Determination of loss on drying" method described.

TABLE 1

Moisture correction table for dibutyl phthalate absorption - anhydrous

| % Water | % Water | | | | |
|---|---|---|---|---|---|
| | .0 | .2 | .4 | .6 | .8 |
| 0 | 0 | 2 | 4 | 5 | 7 |
| 1 | 9 | 10 | 12 | 13 | 15 |
| 2 | 16 | 18 | 19 | 20 | 22 |
| 3 | 23 | 24 | 26 | 27 | 28 |
| 4 | 28 | 29 | 29 | 30 | 31 |
| 5 | 31 | 32 | 32 | 33 | 33 |
| 6 | 34 | 34 | 35 | 35 | 36 |
| 7 | 36 | 37 | 38 | 38 | 39 |
| 8 | 39 | 40 | 40 | 41 | 41 |
| 9 | 42 | 43 | 43 | 44 | 44 |
| 10 | 45 | 45 | 46 | 46 | 47 |

Determination of Conductivity

The electrical conductivity (EC) of silica gels is determined in aqueous suspension on the basis of DIN EN ISO 787-14.

4.00 g of pulverulent silica gel (4±2% moisture content) are weighed to an accuracy of 0.01 g using a precision balance (Sartorius Universal) into a tared 150 ml glass beaker and suspended using 80 ml of deionized water, and the suspension is heated to 100° C. with stirring and boiled at 100° C. for 1 minute. The hot suspension is transferred to a 100 ml graduated flask and cooled in a water bath to 20° C. The suspension is made up to 100 ml with cold deionized water at 20° C. in the graduated flask, and homogenized by shaking.

The suspension is transferred to a 150 ml glass beaker and stirred sufficiently to avoid sedimentation.

The measuring cell of the LF 530 conductivity meter (from WTW) is rinsed with a small quantity of sample, before the LTA01 measuring cell is immersed into the suspension. The value indicated on the display corresponds to the conductivity at 20° C., since the external temperature sensor TFK 530 performs an automatic temperature compensation. This temperature coefficient, and the cell constant k, should be checked prior to each series of measurements. The calibrating solution used is 0.01 mol/l potassium chloride solution (EC at 20° C.=1278 µS/cm).

Determination of Particle Size

The application of laser diffraction for the determination of particle sizes is based on the phenomenon whereby particles scatter monochromatic light with a different intensity pattern in all directions. This scattering is dependent on the particle size. The smaller the particles, the larger the scattering angles.

Sample preparation and measurement (rinsing of the module, etc.) take place, in the case of hydrophilic silica gels, with deionized water or, in the case of silica gels that are not sufficiently wettable with water, with pure ethanol.

In a 100 ml glass beaker, 4 ml of the homogeneous pulverulent silica gel sample (residual moisture content 4±2%) are stirred with a spatula into 50 ml of deionized water or 50 ml of ethanol. The suspension in the glass beaker is treated with an ultrasonic finger (Bandelin, type UW 2200 with DH 13 G horn and 13 mm Ø diamond plate) for 120 s. 100% power is set on the power supply unit of the ultrasonic finger (Bandelin, Sonoplus HD2200). The depth to which the ultrasonic finger is immersed in the suspension is 1 cm. Immediately thereafter the suspension is stirred at 750 rpm (50% stirrer output) on a magnetic stirrer (IKA Labortechnik, Mini MR standard, 0-1500 rpm). The stirring time prior to first sampling is at least 30 s. The suspension is always sampled while it is being stirred.

Prior to the commencement of the measurement, the laser diffraction instrument LS 230 (Coulter) and the liquid module (Small Volume Module Plus, 120 ml, Coulter) are run for 2 h to warm up and the module is rinsed three times with deionized water or, in the case of silica gels that are not sufficiently wettable with water, three times with ethanol. The instrument performs an offset measurement and an adjustment automatically every hour.

In the task bar of the instrument software the menu item "Measurement" is used to select the file window, "Calculate Opt. Model" and the refractive indices are defined in an rfd file as follows: fluid refractive index B. 1. Real=1.333; material refractive index real=1.46; imaginary=0.1.

Measurements with PIDS are carried out if the anticipated particle size distribution is in the submicron range. The pump speed is set at 30 on the instrument.

In principle, prior to each measurement, a background measurement is carried out automatically. A single-use pipette is rinsed three times with the suspension before each sampling. Approximately 2 ml of the suspension are taken up with the pipette and 1-3 drops are metered immediately into the liquid module of the instrument. The remainder in the single-use pipette is put back into the glass beaker. Addition is followed by waiting until the Coulter instrument displays a constant concentration. In the case of measurement with PIDS, the pipette is used, in this way, to add suspension until a light absorption of 45%-55% is reached and the instrument reports "OK". In the case of measurement without PIDS, suspension is added until a light absorption of 8% to 12% is reached and the instrument reports "OK". Measurement takes place at room temperature with the evaluation model of the .rfd file defined above. Three determinations, each of 60 seconds with a waiting time of 0 seconds, are carried out on each silica gel sample.

From the raw data curve the software calculates the particle size distribution on the basis of the volume distribution, taking into consideration the Mie theory and the optical model parameters (.rfd file); from the particle size distribution it is possible to read off, for example, the particle sizes $d_{05}$, $d_{50}$ and $d_{95}$. From these variables it is possible to calculate, as a measure of the breadth of the particle distribution, the span, as follows:

$$\text{Span}=(d_{95}-d_{05})/d_{50}, \text{ where } d_{95}>d_{05}.$$

Determination of Carbon Content

The carbon content of silica gels is determined using the C-mat 500 (Ströhlein Instruments). The samples are heat treated at about 1350° C. and the carbon is oxidized to $CO_2$ by a stream of oxygen. The $CO_2$ is measured in an infrared cell.

In the course of the measurements a distinction is made as to whether the carbon content is greater than or less than 1 percent. If the carbon content of the homogeneous silica samples is above 1 percent, measurement is carried out in the "High" range of the instrument; if it is below 1 percent, measurement is carried out in the "Low" range.

First of all the control sample is measured. For that purpose, 0.14-0.18 g of the control sample is weighed out on an analytical balance into a porcelain boat purified by calcining and cooled to room temperature. When the start button is operated the weight is carried over, since the balance is coupled with the C-mat. The boat must be pushed into the middle of the combustion tube within 30 seconds. When combustion is at an end the measurement is converted into pulses and evaluated by the computer. At least 3 determinations (depending on agreement) are carried out. It may be necessary to readjust the factor of the instrument (for details see operating instructions for C-mat 500, Ströhlein Instruments). This factor is calculated according to the following formula:

$$\text{factor} = \frac{\text{setpoint(standard)} * \text{initial mass(standard) in g} * 10^8}{\text{pulses}}$$

Subsequently the silica gel samples are measured. The initial mass is 0.04-0.05 g. The porcelain boat is covered with a porcelain lid. In the event of deviations >0.005% a greater number of measurements are carried out and the average is calculated.

The operation of the C-mat 500 is taken from the operating instructions from the company Ströhlein Instruments.

The carbon content is calculated as follows and expressed in the unit %:

Carbon content=$(p*F*10^{-8})/E$ p=pulse
F=factor
E=initial mass in g

Determination of Flow Time

The determination of the flow time of paints and similar liquids serves to provide a characteristic number which allows the flow of such substances to be assessed simply and sufficiently for operating purposes. The flow time is the time required by a fixed volume of a liquid medium to flow completely from a standardized flow cup.

The temperature of the coating material and of the DIN cup (Ø outflow nozzle=4 mm) must be 23° C.±0.5° C. before and during flow time measurement. The DIN cup (Ø outflow nozzle=4 mm) is mounted on the stand such that its top edge is aligned horizontally. The outflow nozzle is plugged with the finger, and the coating material, free from bubbles and impurities, is introduced into the DIN cup (Ø outflow nozzle=4 mm) so that the liquid runs over the inner edge of the cup's rim. No air bubbles must enter the sample during its introduction into the cup. Subsequently, coating material standing above the rim is scraped away using a glass plate or a sheet of card.

The flow time measurement begins simultaneously with the release of the lower opening of the outflow nozzle; it ends as soon as the string of liquid below the outflow nozzle breaks for the first time.

The flow time is indicated with an accuracy of 1 second.

Determination of Baking Residue

This method defines a process proven in practice for determining the nonvolatiles content (NVC for short) of resins, resin solutions and paints at elevated temperature. Owing to solvent retention, thermal elimination, evaporation of low molecular mass fractions, and dimensioning of the test container, the values determined by this process are relative values rather than the actual contents. Accordingly, the results obtained according to this standard serve predominantly for testing for consistency of quality.

At least one duplicate determination is carried out. 0.9-1.1 g of the sample is weighed with an accuracy of ±0.001 g into the tared dish and distributed uniformly. After an evaporation time of 10 to 15 minutes at room temperature, the dish is placed for 2 h in the forced-air paint-drying oven, which has been set at 120° C. After the test time in the forced-air paint-drying oven, the dish is cooled to room temperature in a desiccator. The residue is weighed to an accuracy of 0.001 g.

The nonvolatiles content in % (NVC) is calculated in accordance with the following equation:

$$NVC = 100 * \frac{m_3 - m_1}{m_2 - m_1}$$

where:
$m_1$=mass of dish
$m_2$=mass of dish and initial sample
$m_3$=mass of dish and dried sample In the event of differences >0.5% NVC (absolute) the determination should be repeated.

Determination of Coat Thickness

The reflectometer value of matted coating materials is influenced by, among other factors, the coat thickness of the coating. It is therefore necessary to monitor the thickness of the dried coating film precisely.

The following procedure applies only to the measurement of single-coat films on glass substrates. Prior to the implementation of the measurement, the probe of the ultrasonic coat-thickness measuring instrument (QuintSonic, Elektro Physik) must be calibrated in accordance with the instrument operating instructions. After sufficient coupling agent has been applied to the probe measurement area, the probe is placed perpendicularly to the surface of the coating and the measurement is started by pressing the probe button. After a short time the measured value is displayed. The probe is lifted from the measurement area.

At least 5 measurements are carried out at sites distributed uniformly on the object to be measured. It should be ensured that the measurement sites do not exhibit any damage, such as craters, inclusions, scratches, air bubbles, etc., or any soiling.

From the measurement data obtained an average is formed and rounded to an accuracy of 1 μm.

Determination of 60° and 85° Reflectometer Value

The effect exerted on reflectance as a result of deliberate roughening of coating film surfaces is the outstanding property of matting agents based on $SiO_2$. The reflectometer value is therefore an important criterion for characterizing matted coated films.

A prerequisite for the measurement is that the coating film surfaces to be measured should be planar, clean and cured.

The measurement is carried out on at least 3 representative sites on the sample by means of a reflectometer with measuring geometry according to DIN 67530 (e.g. Haze-gloss, BYK Instruments). If the individual measurements deviate from one another too greatly, then generally a further measurement should be carried out at representative sites, or the number of measurements should be increased to >3. On the BYK haze-gloss the display shows the standard deviation of the measurements. If the standard deviation s is >0.5 it is advisable to carry out the abovementioned measures. The average value shall be reported to 1 decimal place.

In the characterization of matted coating film surfaces it has been found appropriate to carry out measurement with the 60° and the 85° measuring geometries. In deviation from DIN 67530, therefore, the reflectometer values of matted coating film surfaces are determined using both measuring geometries.

Determination of Density (Yellow Filter)

When matting agents are used in transparent coating materials there may, depending on matting agent used and binder system, be a more or less pronounced haze appearing, which gives the transparent coating film a bluish undertone. This effect is also known, therefore, as blue haze. No conclusions concerning this effect can be drawn from the analytical test data on the matting agents. A densitometer can be used to detect this effect instrumentally in a reproducible manner on appropriately prepared matt coating materials.

Following calibration, the filter wheel of the Macbeth RD-918 densitometer is set to the "yellow" position. Subsequently at least 5 measurements are carried out. It should be ensured that the measurement sites do not exhibit any damage, such as craters, inclusions, scratches, air bubbles, etc. The greatest allowable deviation between the lowest and highest value, D, must=0.05.

From the measurement data determined an average is to be formed. If the difference between the lowest and highest value, D, exceeds D=0.05, the individual measurement values must be recorded in addition to the average. The result is reported to 2 decimal places.

EXAMPLES

The examples which follow are intended to illustrate the invention without restricting its scope.

Comparative Example C1 a) Preparation of the Hydrogel

A silica gel is prepared from waterglass (Cognis sodium silicate 37/40 filtered) and 45% strength sulfuric acid.

For this purpose, 45% strength by weight sulfuric acid and sodium silicate are mixed thoroughly so as to produce a reactant ratio corresponding to an excess of acid (0.25N) and to an $SiO_2$ concentration of 18.5% by weight. The resulting hydrogel is stored for 12 h and then broken to a particle size of approximately 1 cm.

It is washed with deionized water until the conductivity of the washwater is below 5 mS/cm. It is then aged at 80° C. for 10-12 hours at a pH of 9, with addition of ammonia, after which the pH is adjusted to 3 using 45% strength by weight sulfuric acid. The hydrogel at this point has a solids content of 34%-35%. Subsequently it is coarsely ground to a particle size of approximately 150 μm on a pinned-disk mill (Alpine type 160Z). After drying in a laboratory oven (3 h, 160° C.), the product has a BET surface area of 320-340 $m^2/g$.

b) Preparation of the Xerogel:

The preground hydrogel is dried using a spin-flash dryer (Anhydro A/S, APV, type SFD47, $T_{in}$=350° C., $T_{out}$=130° C.) such that, after drying, it has a final moisture content of approximately 2% and a BET surface area of approximately 330 $m^2/g$. Then it is ground to an average particle size ($d_{50}$) of 6.7 μm on a fluidized-bed opposed-jet mill (Alpine, AFG 100).

The physicochemical data of comparative example 1 are found in table 2.

Example 1

7 kg of the hydrogel from comparative example 1a) (corresponding to 2.45 kg of $SiO_2$) are admixed in an Eirich mixer (type RO2, operated at level 1) at room temperature with 0.245 kg of the emulsion of an alkoxymethylpolysiloxane (Foamex 1435, Tego GmbH; product data sheet of May 1999) in a weight ration of 28.6:1 (hydrogel: alkoxymethylpolysiloxane emulsion). The alkoxymethylpolysiloxane emulsion is added to the hydrogel over the course of 3 minutes, followed by mixing for 7 minutes. The resulting mixture, after a standing time of 2 h, is dried using the spin-flash dryer (Anhydro A/S, APV, type SFD47, $T_{in}$=350° C., $T_{out}$=120° C.) and ground to an average particle size $d_{50}$ of 6.7 μm on a fluidized-bed opposed-jet mill (Alpine, AFG 100).

The physicochemical data of example 1 are found in table 2.

Example 2

In the same way as in example 1 a surface-modified silica gel is prepared, the hydrogel being mixed with the alkoxymethylpolysiloxane emulsion in a weight ratio of 11.4:1. The physicochemical data of example 2 are found in table 2.

Example 3

In the same way as in example 1 a surface-modified silica gel is prepared, the hydrogel being mixed with the alkoxymethylpolysiloxane emulsion in a weight ratio of 5.7:1.

The physicochemical data of example 3 are found in table 2.

TABLE 2

| | Example | | | | | | |
|---|---|---|---|---|---|---|---|
| | 1 | 2 | 3 | C1 | C2 | C3 | C4 |
| organically modified | yes | yes | yes | no | yes | yes | yes |

TABLE 2-continued

| | | Example | | | | | | |
|---|---|---|---|---|---|---|---|---|
| | | 1 | 2 | 3 | C1 | C2 | C3 | C4 |
| BET surface area (singlepoint) | m²/g | 302 | 275 | 239 | 330 | 207 | 306 | 254 |
| mesopore volume (2-50 nm) | ml/g | 1.82 | 1.78 | 1.65 | 1.91 | 0.44[1] | 1.48 | 1.51[1] |
| tapped density | g/l | 110 | 117 | 125 | 105 | 79 | n.d. | 127 |
| carbon content | % | 0.85 | 2.10 | 3.80 | 0.02 | 3.78 | 7.00 | 7.40 |
| loss on drying | % | 3.0 | 2.5 | 1.9 | 1.9 | 5.3 | 0.9 | 4.5 |
| loss on ignition | % | 4.8 | 5.7 | 7.2 | 3.8 | 9.3 | n.d. | 12.0 |
| pH | | 3.1 | 3.1 | 3.1 | 2.9 | 6.1 | n.d. | 3.4 |
| conductivity | μS/cm | 500 | 480 | 450 | 648 | 280 | n.d. | 164 |
| DBP (anhydrous) | g/100 g | 262 | 255 | 235 | 278 | 334 | n.d. | 257 |
| $d_{05}$ | μm | 2.9 | 2.9 | 2.8 | 3.0 | 2.0 | 2.0 | 1.9 |
| $d_{50}$ | μm | 6.7 | 6.8 | 6.7 | 6.7 | 6.3 | 5.7 | 6.4 |
| $d_{95}$ | μm | 10.5 | 10.8 | 10.8 | 11.0 | 14.0 | 10.1 | 15.7 |
| span | | 1.134 | 1.162 | 1.194 | 1.194 | 1.905 | 1.421 | 2.156 |

[1] mesopore volume (2-30 nm)
n.d. = not determined

Example 4

Test of the Coatings Properties of the Silica Gels of the Invention in a Coil Coating Material Apparatus
  ball mill KU 5 with rotary stand
  precision balance, laboratory paddle stirrer, grindometer block 0-25 μm, 0-50 μm, 0-100 μm, flow cup DIN 53211 (4 mm)
  wire-wound coating bar 80 μm
  aluminum Bonder panels 722 W OF
  phosphated steel panels QUV R-36-I
  forced-air paint-drying oven with coil coating insert
  forced-air paint-drying oven
  coat thickness measuring instrument
  gloss meter (reflectometer) DIN 67530

Procedure

Coating formula 1

| Item | Ingredient | Weight fraction in % |
|---|---|---|
| 1 | Dynapol LH 831 70% in Solv. 150/BG (Degussa AG, supply range of July 2002) | 35.0 |
| 2 | butyl glycol | 6.8 |
| 3 | titanium dioxide Kronos 2310 (Kronos, product data sheet 2.2 of 2000) | 29.7 |
| 4 | Aerosil R972 (Degussa AG, product information from Internet of 23 Mar. 2004) | 0.2 |
| 5 | Dynapol LH 831 70% in Solv. 150/BG | 7.8 |
| 6 | Cymel 303 (Cytec Ind. Inc., product data sheet of February 2003) | 7.3 |
| 7 | Solvesso 100 (ExxonMobil Chemical, product data sheet of July 2003) | 7.0 |
| 8 | butyl diglycol | 3.7 |
| 9 | Disparton L1984 50% in Solvesso 200 S (Kusumoto Chemicals Ltd., product data sheet of January 1998) | 1.5 |
| 10 | BYK Catalyst 450 (Byk Chemie, product information of June 2006) | 0.2 |
| 11 | Dynapol Catalyst BL1203 (Degussa AG, safety data sheet of Mar. 11, 2004) | 0.8 |
| | Total | 100.0 |

The ingredients of items 1-4 are dispersed at 60 rpm for 48 h in a KU 5 ball mill charged with 4900 g of Alubit balls. Then the ingredients of items 5-11 are added and mixing is carried out likewise at 60 rpm for 30 minutes. The ball mill charge is chosen so that a total amount of 5000 g of ingredients can be processed. The grindometer value (setpoint <12 μm), the baking residue (setpoint approximately 67.5%) and the flow time (set point approximately. 40 s) of the glossy white coil coating material thus prepared are measured. To determine the 20° reflectometer value the unmatted coating material is applied using an 80 μm wire-wound coating bar to phosphated steel panels of type QUV R-36-I, and after an evaporation time of 30 s the panels are baked at a panel temperature of 235° C. for a period of 90 s. For a coat thickness of approximately 22 μm the 20° reflectometer value ought to be 75±5.

Before the coating material is used each time it should be agitated at 1000 rpm in the dissolver for 10 minutes. Precipitated silica or silica gel, in accordance with table 3, is weighed out into a 350 ml polyethylene beaker for 150 parts by weight of the unmatted coil coating material. The precipitate of silica or the silica gel is carefully incorporated into the test coating material using a spatula. Thereafter the compositions are dispersed with a paddle stirrer (diameter 43 mm) at 2000 rpm for 10 minutes, the PE beaker being covered in order to prevent evaporation losses. After the matting agent has been incorporated, the matted coating material is left to stand in the sealed beaker for 30 minutes, to allow volatiles to escape. Subsequently the grindometer value and flow time are measured.

The matted coating material is applied using an 80 μm wire-wound coating bar to phosphated steel panels of type R-36-I. After an evaporation time of 30 seconds the coating material is baked at a panel temperature of 235° C. for 90 seconds. Thereafter the coat thickness of the coating material, the 60° and 85° reflectometer values and the sheen (i.e., 85° reflectometer value −60° reflectometer value) are calculated (see table 3).

The data in table 3 show that the matting efficiency of the surface-modified silica gels of the invention in this coating system is comparable with that of the comparative examples; in other words, the surface modification of the invention does not lead to any impairment in matting efficiency.

TABLE 3

Coil coating material

| Silica gel/ silica from Example | Initial mass [g] | Coat thickness [μm] | 60° reflectometer value [%] | 85° reflectometer value [%] | Sheen [%] |
|---|---|---|---|---|---|
| 1 | 6.0 | 24 | 29.1 | 71.4 | 42.3 |
| 2 | 6.1 | 23 | 29.9 | 71.4 | 41.5 |
| 3 | 6.8 | 23 | 30.2 | 72.0 | 41.8 |
| C 1 | 6.0 | 23 | 30.0 | 70.3 | 40.3 |
| C 2 | 5.4 | 24 | 29.3 | 72.5 | 43.2 |
| C 3 | 7.4 | 24 | 30.0 | 76.1 | 46.1 |
| C 4 | 6.4 | 24 | 30.1 | 71.7 | 41.6 |

Example 5

Coatings Properties in a 2-Component Coating Material

When matting agents are used in transparent coating materials there may, depending on matting agent used and binder system, be a more or less pronounced haze appearing, which gives the transparent coating film a bluish undertone. This effect is also known, therefore, as blue haze. No conclusions concerning this effect can be drawn from the analytical test data on the matting agents. A calorimeter, for example a densitometer, can be used to detect this effect instrumentally in a reproducible manner on appropriately prepared matt coating materials.

The application of matted 2K (2-component) PU coating materials to black glass sheets reduces the depth of color of the black glass sheet in accordance with the extent of the haze. By measuring the density, i.e. depth of color, through the coating film, it is possible to draw, indirectly, a conclusion concerning the extent of the haze and hence also concerning the transparency of the coating material.

Apparatus
  laboratory paddle stirrer
  flow cup to DIN 53211, 4 mm
  film-drawing instrument, e.g. Coatmaster 509 MC, Erichsen
  film-drawing bar, 150 μm
  forced-air paint-drying oven
  coat thickness measuring instrument (e.g., Quintsonic PRO, Erichsen)
  gloss meter (e.g. BYK haze-gloss) DIN 67530
  instrument for measuring depth of color (densitometer)
  fully-colored black plane glass sheets 180×80×6 mm Preparation and Testing of the Glossy Test Coating Material The individual ingredients for the 2-component test coating material are weighed out in succession in the order indicated below, and homogenized using the laboratory stirrer.

Coating formula 2 (2K reference varnish for the purposes of the invention)

| Ingredient | Weight fraction in % |
|---|---|
| butyl acetate 98% | 8.3 |
| ethoxypropyl acetate | 16.5 |
| Desmophen 800 (Bayer AG, product data sheet of Apr. 20, 2002) | 15.0 |
| Desmophen 1100 (Bayer AG, product data sheet of Apr. 20, 2002) | 20.0 |
| CAB 381-0.5 (10% strength in butyl acetate 98%, Eastman, product data sheet of Sep. 30, 2003) | 3.0 |
| Mowilith 20 (50% strength in ethyl acetate) (Kremer Pigmente, product data sheet of May 14, 2004) | 3.0 |
| Baysilone OL 17 (10% strength in xylene) (Borchers, product information of Dec. 12, 2002) | 0.1 |
| BYK 361 (BYK-Chemie, product data sheet of May 2003) | 0.3 |
| xylene | 33.8 |
| Total | 100.0 |

The glossy test coating material is tested for flow time (setpoint: 14-15 s) and baking residue (setpoint: 36.0±0.5%).

Preparation and Testing of the Matted Test Coating Material

Prior to use, the gloss coating material is homogenized using the paddle stirrer. Precipitated silica or silica gel, in accordance with the initial masses indicated in tables 4 and 5, is weighed out into 150 g of the 2-component test coating material.

Following careful incorporation using a spatula, the matting agent is dispersed with a paddle stirrer (4 cm diameter) at 2000 rpm for 10 minutes in a 350 ml PE beaker. After the matting agent has been dispersed, the coating material is left to stand for 24 h for volatiles to escape. Thereafter the viscosity of the matted test coating material is determined as follows by means of the Haake viscometer $6^R$ at 6 rpm and at 60 rpm, and the ratio thereof is determined as well, as follows (see table 4):

Shortly before the beginning of the measurement the viscometer (Haake viscometer $6^R$) is switched on, self-testing is carried out, and spindle size and rotational speed are set on the instrument. The spindle is inserted on the viscometer and immersed into the coating material up to the mark on the spindle shaft. The viscometer is started. The spindle is rotated in the coating material for 2 minutes and then the measured value for the setting at 6 rpm is read off. After that the spindle is rotated in the coating material for a further 2 minutes, and finally the measured value for the setting at 60 rpm is read off. The preparations and measurement are carried out at 23° C. and 50% RH.

Subsequently the matted 2-component test coating material is admixed with 50 g of Desmodur L 75 curing agent and homogenized with the laboratory stirrer (4 cm diameter) at 1000 rpm for 2 minutes. After homogenization has taken place, the coating material is left to stand again for 30 minutes. The matted 2-component test coating material is applied using the Coatmaster 509 MC film-drawing instrument with a drawing speed of 25 mm/s and a film-drawing frame with a slot height of 150 μm, onto a clean black plane glass sheet. The evaporation time is 25 to 30 minutes at a room temperature of 21 to 23° C. and a relative humidity of 40% to 60%. Thereafter the glass sheets are dried in a drying oven at 50±2° C. for 2 hours. After they have cooled to room temperature, coat thickness, 60° reflectometer value, 85° reflectometer value and density (yellow filter) are determined and the sheen (i.e., 85° reflectometer value −60° reflectometer value) is calculated (see table 4).

Table 4 shows the data determined following the incorporation of various precipitated silicas and silica gels into the 2-component coating material, for the same initial mass. The data show that the surface-modified silica gels of the invention exhibit a comparable or even, in some cases, improved transparency (density) and matting efficiency to those of the comparable examples. The advantage of the surface-modified silica gels of the invention becomes particularly clear in the results of the viscosity measurement.

At low shear, there is virtually no increase in the viscosity of the coating material as a result of the surface-modified silica gels of the invention, whereas the viscosity is increased drastically by the comparative examples.

While the comparative examples still increase the viscosity of the coating material even under high shear, there is virtually no effect on the coating material by the surface-modified silica gels of the invention.

The low thixotropic index TI 6/60 of the surface-modified silica gels of the invention shows that the viscosity in the sheared state is reduced only insignificantly as compared with the unsheared state, whereas in the comparative examples the sharply increased viscosity of the coating material in the unsheared state, as a result of the addition of the said comparative examples, is very sharply adversely affected by the shearing.

To determine the data in table 5, an amount of precipitated silica or silica gel sufficient to give a comparable 60° reflectometer value of 23-25 in the dried coating material is added to the 2-component coating material. For the silica gels of the invention, the amount of product required for a comparable matting efficiency is almost exactly the same as for the comparative examples based on silica gels (comparative examples 3 and 4).

The transparency (density) of the surface-modified silica gels of the invention is well above that of the comparative examples.

TABLE 4

2-Component coating material for the same initial mass

| Silica gel/silica from Example | Initial mass [g] | Viscosity at 6 rpm [mPa * s] | Viscosity at 60 rpm [mPa * s] | TI 6/60 | Density |
|---|---|---|---|---|---|
| 1 | 18 | 821[1] | 209[1] | 3.93 | 2.52 |
| 2 | 18 | 616[1] | 166[1] | 3.71 | 2.55 |
| 3 | 18 | 263[1] | 123[1] | 2.14 | 2.54 |
| C 1 | 18 | 1329[1] | 284[1] | 4.68 | 2.23 |
| C 2 | 18 | 15430[2] | 1890[2] | 8.16 | 1.35 |
| C 3 | 18 | 6370[2] | 720[1] | 8.85 | 2.40 |
| C 4 | 18 | 1639[1] | 324[1] | 5.06 | 2.41 |
| 2-component coating material without silica gel[3] | 18 | 0[1] | 40[1] | — | 2.70 |

[1]measured with spindle R 2
[2]measured with spindle R 4
[3]further viscosity measurements: viscosity at 20 rpm = 25 mPa * s
viscosity at 200 rpm = 70 mPa * s
TI 20/200 = 0.36

TABLE 5

2-Component coating material for the same 60° reflectometer value

| Silica gel/silica of Example | Initial mass[1] [g] | Coat thickness [μm] | 60° reflectometer value [%] | 85° reflectometer value [%] | Sheen [%] | Density |
|---|---|---|---|---|---|---|
| 1 | 18.0 | 32 | 23.6 | 53.2 | 29.6 | 2.38 |
| 2 | 18.9 | 32 | 22.6 | 52.0 | 29.4 | 2.32 |
| 3 | 21.0 | 32 | 23.0 | 53.3 | 30.3 | 2.46 |
| C 1 | 16.2 | 32 | 24.3 | 56.6 | 32.3 | 2.48 |

TABLE 5-continued

2-Component coating material for the same 60° reflectometer value

| Silica gel/silica of Example | Initial mass[1] [g] | Coat thickness [μm] | 60° reflectometer value [%] | 85° reflectometer value [%] | Sheen [%] | Density |
|---|---|---|---|---|---|---|
| C 2 | 11.25 | 32 | 23.2 | 57.8 | 34.6 | 2.30 |
| C 3 | 15.75 | 32 | 23.9 | 70.4 | 46.5 | 2.40 |
| C 4 | 18.75 | 32 | 24.3 | 62.8 | 38.5 | 2.30 |

[1]based on 100 g of unmatted coating material

Example 6

Sedimentation Behavior in a Nitrocellulose Lacquer

Physicochemical data for silicas cannot be used to draw conclusions concerning the suspension and redispersion behavior of these substances in a coating material. On the basis of this finding, performance testing in an appropriate coating system is necessary.

Apparatus and Ingredients
    laboratory paddle stirrer
    balance
    PE beaker, 170 ml
    flow cup DIN 53211, 4 mm
    stopwatch
    drying cabinet
    Jouan CT 4.22 centrifuge
    glass bottles, transparent, 50 ml, narrow neck Procedure The solvents of items 1 to 4 are introduced initially and mixed with the paddle stirrer. The NC chips E 510 are added with stirring and dissolved with the paddle stirrer. Subsequently items 6-10 are added with continual stirring to the lacquer.

Coating formula 3

| Item | Ingredient | Weight fraction in % |
|---|---|---|
| 1 | toluene | 15.0 |
| 2 | butanol | 10.0 |
| 3 | ethyl acetate | 10.0 |
| 4 | butyl acetate 85% | 10.0 |
| 5 | NC chips E 510 (82% NC 18% DBP) (Wolff Cellulosics, product information from Internet of Mar. 23, 2004) | 12.0 |
| 6 | dibutyl phthalate (DBP) | 1.0 |
| 7 | castor oil 18 P, blown | 2.0 |
| 8 | Jägalyd E 42, 60% strength in xylene (Eastman Chemicals, Fax of May 17, 2004) | 10.0 |
| 9 | Alresat KM 313, 50% strength in ethyl acetate:butyl acetate (85%) 1:1 (Clariant) | 20.0 |
| 10 | Petroleum spirit 100/140 | 10.0 |
| | Total | 100.0 |

The flow time of this lacquer is measured using the DIN cup (outflow nozzle Ø=4 mm) and adjusted with the solvent mixture below to a flow time of 40 s at 23° C.

| Item | Ingredient | Weight fraction in % |
|---|---|---|
| 1 | butyl acetate 85% | 30.0 |
| 2 | ethyl acetate | 30.0 |
| 3 | toluene | 30.0 |
| 4 | butanol | 10.0 |
| | Total | 100.0 |

Preparation and Testing of the Matt Coating Material 0.4 g of precipitated silica or silica gel is weighed out into a polyethylene beaker (170 ml) to 40 g of coating material, and then incorporated completely using the spatula. Thereafter the matting agent is dispersed with a paddle stirrer (4 cm diameter) at 2000 rpm for 10 minutes. During this operation the beaker is covered.

About 40 g of matted coating material is introduced into glass bottles. The glass bottles are screwed closed. The centrifuge is loaded with glass bottles. Centrifugation is carried out for a time of 14 h, with the following settings.

| Program point | Setting |
|---|---|
| Radius: | 185 mm |
| Time/integral: | 1 |
| Time/duration run | 0 m0 s |
| Temperature: | 35° C. |
| Delta temperature: | +4° C. |
| Acceleration: | 0 |
| Braking: | 0 |
| Rotary speed/RZB: | 0 |
| RZB: | 15 g |
| Cooling: | off |

For assessment, the bottles are cooled to room temperature. In order to test the nature of the sediment the bottles are placed upside down in a bottle holder and the draining of the phase containing matting agent is observed.

Subsequently the glass bottles are shaken twice by hand. If no sediment can be seen, the bottom of the bottle is scratched with a needle. This treatment finds even extremely thin unwanted deposits.

The nature of the sediment is evaluated as follows:
1=no separation of coating material and matting agent
2=loose sediment (the sediment runs completely from the base and can be dispersed by swirling once or twice.)
3=soft sediment (the sediment does not run completely from the base, but can still be dispersed by shaking a number of times.)
4=soft sediment, difficult to reagitate (the sediment is still soft, but has already agglomerated to such an extent that it can no longer be adequately dispersed by shaking.)
5=solid sediment The sedimentation behavior of examples 1-3 and of comparative examples 1-3 is indicated in table 6.

Example 7

Determination of the Detachment Behavior in Ethoxypropyl Acetate

Silica-based matting agents are after-treated with organic substances in order to prevent sedimentation in coating materials. For application in coating materials it is important that the coating agent is firmly adsorbed on the silica surface and cannot be detached by the action of constituents of the coating material. This test allows detachment of the coating agent to be ascertained and hence unsuitable coating agents to be identified.

Apparatus laboratory stirrer, PE beaker
wide-necked glass bottle, 50 ml
paint-drying oven Procedure 1 g of surface-modified silica gel or precipitated silica is weighed out into 35 g of ethoxypropyl acetate. The suspension is dispersed with a paddle stirrer (diameter: 40 mm) at 1000 rpm for 10 minutes in a PE beaker and transferred to a 50 ml wide-necked glass bottle. Subsequently the glass bottle is stored in a paint-drying oven at 50° C. for 24 hours. After the suspension has cooled, resultant sediment and the supernatant liquid phase are evaluated visually (see table 6).

Detachment of the organic components is manifested in the formation of deposits on the inside of the glass at the height of the liquid/air interface, these deposits being impossible to redisperse by simple shaking. In general, the visual assessment permits effective recognition of whether these deposits consist predominantly of the coating agent used or of coated silica. If the visual findings are unclear, a supplementary analysis can be carried out in order to assist with identification of the deposit (e.g., IR spectroscopy).

Example 8

Determination of Discoloration in an AC Coating Material

The aim of this test method is to analyze matting agents for their discoloration in an AC coating material by comparison with the corresponding laboratory standard (white color) of the respective matting agent and, respectively, with a negative standard which shows the lowest inadmissible discoloration.

Apparatus

Laboratory paddle stirrer (diameter: 4 cm)
PE beaker 170 ml
spatula
precision balance (weighing accuracy 0.01 g)
50 ml narrow-necked glass bottle
centrifuge if appropriate.

Testing for Discoloration

The test coating material for the discoloration is prepared by dispersing the ingredients indicated below. For this purpose the individual ingredients are weighed out in succession and mixed with a paddle stirrer to the point of complete homogenization. Subsequently 50 parts by weight of coated material are introduced into a 170 ml PE beaker and 1.3 parts by weight of matting agent are weighed in and carefully incorporated by stirring with a spatula. Thereafter the formula is dispersed at 2000 $min^{-1}$ for 10 minutes using a laboratory paddle stirrer, and about 40 g of the samples are introduced into 50 ml narrow-necked glass bottles. The glass bottles are screwed closed. The matting agent is induced to undergo sedimentation by storage at room temperature for 5 days.

| | Coating formula 4 | |
|---|---|---|
| Item | Ingredient | Weight fraction in % |
| 1 | Plastopal BT, 60% strength in butanol (BASF, product information of 07/1994) | 39.6 |
| 2 | xylene | 30.2 |
| 3 | ethoxypropanol | 15.1 |
| 4 | Ethanol | 15.1 |
| | Total | 100.0 |

During the assessment of discoloration, the samples are placed on a white background, and transmitted light from the rear side must be ensured. To assess the discoloration, the lids of the sample bottles are removed, since reflections from the black lid underside result in an apparent discoloration. The results are recorded in table 6.

From table 6 it is apparent that, as a result of the surface modification, the propensity of silica gels or precipitated silicas to form sedimentation in the coating material is greatly reduced. Whereas sedimentation values of not more than 2 are achieved by means of the known agents and processes for surface modification, the sedimentation value can be increased even to 1 by thee surface modification of the invention, as shown by example 2; in other words, no sedimentation propensity is evident even over a longer period of time.

Whereas in the case of comparative examples 3 and 4 the surface-modifying agent can be removed from the surface of the silica gel by exposure to ethoxypropyl acetate, no such impairment is observed in the case of the surface-modified silica gels of the invention.

Yellowish discoloration of the coating material is frequently observed as a result of adding the matting agent, as evident from the comparative examples. In contrast, it is a feature of the surface-modified silica gels of the invention that the coating material remains clear even after the matting agent has been added.

TABLE 6

Nitrocellulose lacquer - sedimentation behavior

| Silica gel/silica from Example | Surface-modified | Sedimentation behavior | Detachment behavior | Discoloration |
|---|---|---|---|---|
| 2 | yes | 3 | no | clear |
| 3 | yes | 1 | no | clear |
| C1 | no | 5 | — | yellowish |
| C2 | yes | 2 | no | slightly yellowish |
| C3 | yes | 2 | yes | slightly yellowish |
| C4 | yes | 2 | yes | slightly yellowish |

The invention claimed is:

1. A surface-modified silica gel which influences the viscosity of a 2-component reference varnish, containing 10.7% by weight of the surface-modified silica gel and stored, following preparation and addition of the surface-modified silica gel, at 23° C. and 50% relative humidity (RH) for 1 day, in such a way that the thixotropic index TI 6/60 is less than or equal to 4.5, wherein the surface of the silica gel is coated with a polyorganosiloxane having the following general structure:

$$Y-\underset{R}{\underset{|}{Si}}-O-\left[\underset{R}{\underset{|}{Si}}-O\right]_a\left[\underset{\underset{O}{|}}{\underset{|}{Si}}-O\right]-\left[\underset{R}{\underset{|}{Si}}-O\right]_c\underset{R}{\underset{|}{Si}}-Y$$
$$\left[R^2-\underset{|}{\underset{|}{Si}}-R^2\atop \underset{R^2-\underset{|}{\underset{|}{Si}}-R^2}{\underset{|}{O}}\right]_d$$

wherein

Y = —OH, —OR or
Y = $H_5C_2$—O—$(C_2H_4O)_m$—, $H_7C_3$—O—$(C_3H_6O)_m$—, or
Y = $R^2C=C-(CH_2-CH)_k-$
         $|$         $|$
         $R^4$     $COOR^3$

R = -alkyl,
$R^2$ = alkyl or H,
$R^3$ = alkyl,
$R^4$ = H or alkyl,
a = 0-100, b = 0-100, c = 0-100, d = 0-100,
    m = 0-100 and k = 0-100, with the proviso that a, b, c and d are each not 0 simultaneously.

2. A surface-modified silica of gel as claimed in claim 1, wherein R=methyl or ethyl.

3. A surface-modified silica gel as claimed in claim 1, which influences the viscosity of a 2-component reference varnish, containing 10.7% by weight of the surface-modified silica gel and stored, following preparation and addition of the surface-modified silica gel, at 23° C. and 50% relative humidity (RH) for 1 day, in such a way that the thixotropic index TI 6/60 is less than or equal to 4.0.

4. A surface-modified silica gel as claimed in claim 1, which increases the viscosity of a 2-component reference varnish, containing 10.7% by weight of the surface-modified silica gel and stored, following preparation and addition of the surface-modified silica gel, at 23° C. and 50% relative humidity (RH) for 1 day, in the low-shear state to a maximum of 1200 mPa*s.

5. A surface-modified silica gel as claimed in claim 4, which increases the viscosity of a 2-component reference varnish, containing 10.7% by weight of the surface-modified silica gel and stored, following preparation and addition of the surface-modified silica gel, at 23° C. and 50% relative humidity (RH) for 1 day in the low-shear state to a maximum of 900 mPa*s.

6. A surface-modified silica gel as claimed in claim 1, having the following physicochemical data:

| | |
|---|---|
| average particle size $d_{50}$: | 0.5-50 μm |
| DBP: | 100-600 g/100 g |
| BET: | 100-1000 m²/g |
| carbon content: | 0.5-20%. |

7. A surface-modified silica gel as claimed in claim 1, which has a mesopore volume in the range from 2 to 50 nm of at least 1.0 ml/g.

8. A surface-modified silica gel as claimed in claim 1, which has a span <1.3.

9. A surface-modified silica gel which influences the viscosity of a 2-component reference varnish, containing 10.7% by weight of the surface-modified silica gel and stored, following preparation and addition of the surface-modified silica gel, at 23° C. and 50% relative humidity (RH) for 1 day, in such a way that the thixotropic index TI 6/60 is less than or equal to 4.5, wherein the surface of the silica gel is coated with a polyorganosiloxane having the following general structure:

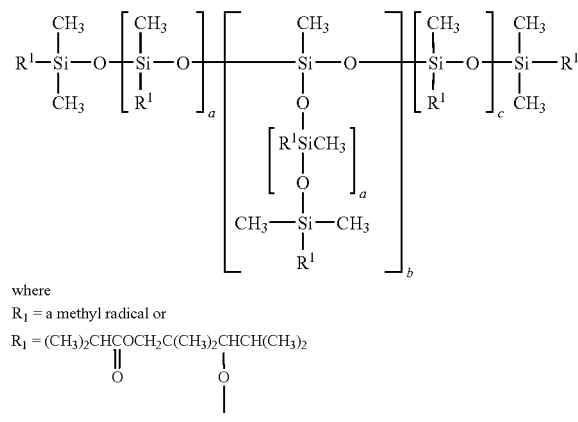

where
$R_1$ = a methyl radical or
$R_1$ = $(CH_3)_2CHCOCH_2C(CH_3)_2CHCH(CH_3)_2$
      $\parallel$                    $\mid$
      $O$                            $O$ and/or
$R_1$ = $(CH_3)_2CHCOCHC(CH_3)_2CH_2O$ —
      $\parallel$  $\mid$
      $O$   $CH$—$CH_3$
            $\mid$
            $CH_3$ and the sum of the units a=0 to 100, the sum of the units b=0 to 15, the ratio of methyl to alkoxy radicals $R^1$ being less than 50:1, and b>1 if a=0 and a>5 if b=0.

10. A surface-modified silica gel as claimed in claim 9, which influences the viscosity of a 2-component reference varnish, containing 10.7% by weight of the surface-modified silica gel and stored, following preparation and addition of the surface-modified silica gel, at 23° C. and 50% relative humidity (Rh) for 1 day, in such a way that the thixotropic index TI 6/60 is less than or equal to 4.0.

11. A surface-modified silica gel as claimed in claim 9, which increases the viscosity of a 2-component reference varnish, containing 10.7% by weight of the surface-modified silica gel and stored, following preparation and addition of the surface-modified silica gel, at 23° C. and 50% relative humidity (RH) for 1 day, in the low-shear state to a maximum of 1200 mPa*s.

12. A surface-modified silica gel as claimed in claim 11, which increases the viscosity of a 2-component reference varnish, containing 10.7% by weight of the surface-modified silica gel and stored, following preparation and addition of the surface-modified silica gel, at 23° C. and 50% relative humidity (RH) for 1 day in the low-shear state to a maximum of 900 mPa*s.

13. A surface-modified silica gel as claimed in claim 9, having the following physicochemical data:

| | |
|---|---|
| average particle size $d_{50}$: | 0.5-50 μm |
| DBP: | 100-600 g/100 g |
| BET: | 100-1000 m²/g |
| carbon content: | 0.5-20%. |

14. A surface-modified silica gel as claimed in claim 9, which has a mesopore volume in the range from 2 to 50 nm of at least 1.0 ml/g.

15. A surface-modified silica gel as claimed in claim 9, which has a span<1.3.

16. A process for preparing a surface-modified silica gel which influences the viscosity of a 2-component reference varnish, containing 10.7% by weight of the surface-modified silica gel and stored, following preparation and addition of the surface-modified silica gel, at 23° C. and 50% relative humidity (RH) for 1 day, in such a way that the thixotropic index TI 6/60 is less than or equal to 4.5, which comprises modifying the surface of a silica gel with a polyorganosiloxane having the following general structure:

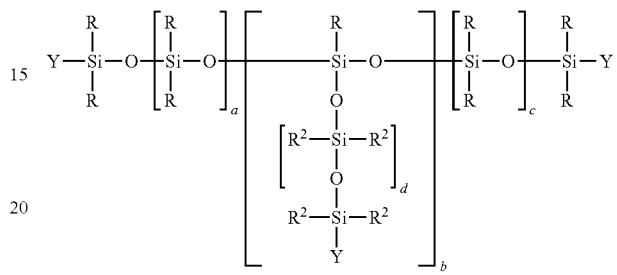

wherein
$Y$ = —OH, —OR or
$Y$ = $H_5C_2$—O—$(C_2H_4O)_m$—, $H_7C_3$—O—$(C_3H_6O)_m$—, or
$Y$ = $R^2C$=$C$—$(CH_2$—$CH)_k$—,
          $\mid$       $\mid$
          $R^4$      $COOR^3$ $R$ = -alkyl,
$R^2$ = alkyl or H,
$R^3$ = alkyl,
$R^4$ = H or alkyl,
a = 0-100, b = 0-100, c = 0-100, d = 0-100,
    m = 0-100 and k = 0-100, with the proviso that a, b, c and d are each not 0 simultaneously.

17. A process as claimed in claim 16, comprising the steps of
a) preliminary grinding of the hydrogel
b) drying of the hydrogel to give the xerogel
c) grinding of the xerogel
d) surface modification.

18. A process as claimed in claim 17, wherein step d) is carried out before or during at least one of steps a) to c).

19. A process as claimed in claim 17, wherein the polymer in step d) is added as the pure, undiluted substance or in dilute form as an aqueous emulsion.

20. A process as claimed in claim 17, wherein in step a) or in step d), when performed before step a), a hydrogel is used which has the following physicochemical properties:

| | |
|---|---|
| SiO₂ fraction: | ≧5%, |
| BET surface area: | 200-500 m²/g. |

21. A process as claimed in claim 20, wherein in step a) or in step d), when performed before step a), a hydrogel is used which has the following physicochemical properties:

| | |
|---|---|
| SiO₂ fraction: | 20%-40%, |
| BET surface area: | 250-400 m²/g. |

22. A process as claimed in claim 17, wherein step d) is carried out before step b).

23. A process as claimed in claim 21, wherein the hydrogel in step d) is mixed with 0.2% to 12% by weight of the polymer, based on the hydrogel.

24. A process as claimed in claim 21, wherein the hydrogel in step d) is mixed with 0.5% to 5%, by weight of the polymer, based on the hydrogel.

25. A process as claimed in claim 17, wherein the drying in step b) is carried out by means of spray dryers or grinding dryers or pneumatic dryers or spin-flash dryers.

26. A process as claimed in claim 17, wherein step d) is carried out after step b) but before step c).

27. A process as claimed in claim 17, wherein step d) is carried out during step c).

28. A process as claimed in claim 17, wherein the grinding in step c) takes place by means of an air-jet or steam-jet mill or fluidized-bed opposed-jet mill.

29. A process as claimed in claim 17, wherein after the surface-modified silica gel has been dried or after or during the grinding operation particles having a diameter of more than 50 μm are separated off.

30. A process for preparing a surface-modified silica gel which influences the viscosity of a 2-component reference varnish, containing 10.7% by weight of the surface-modified silica gel and stored, following preparation and addition of the surface-modified silica gel, at 23° C. and 50% relative humidity (RH) for 1 day, in such a way that the thixotropic index TI 6/60 is less than or equal to 4.5,
which comprises modifying the surface of a silica gel with a polyorganosiloxane having the following general structure:

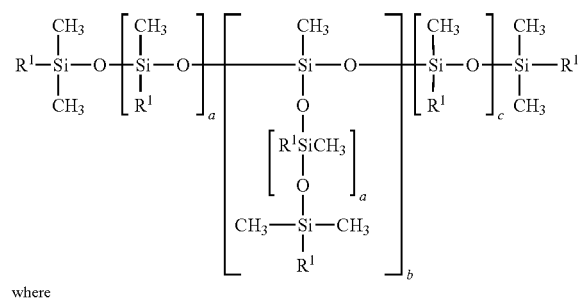

where
$R_1$ = a methyl radical or
$R_1$ = (CH$_3$)$_2$CHCOCH$_2$C(CH$_3$)$_2$CHCH(CH$_3$)$_2$

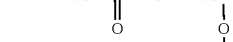

and/or
$R_1$ = (CH$_3$)$_2$CHCOCHC(CH$_3$)$_2$CH$_2$O —

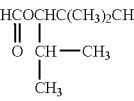

and the sum of the units a=0 to 100, the sum of the units b=0 to 15, the ratio of methyl to alkoxy radicals $R^1$ being less than 50:1, and b>1 if a=0 and a>5 if b=0.

31. A process as claimed in claim 30, comprising the steps of
a) preliminary grinding of the hydrogel
b) drying of the hydrogel to give the xerogel
c) grinding of the xerogel
d) surface modification.

32. A process as claimed in claim 31, wherein step d) is carried out before or during at least one of steps a) to c).

33. A process as claimed in claim 30, wherein the polymer in step d) is added as the pure, undiluted substance or in dilute form as an aqueous emulsion.

34. A process as claimed in claim 30, wherein in step a) or in step d), when performed before step a), a hydrogel is used which has the following physicochemical properties:

| SiO$_2$ fraction: | ≧5%, |
|---|---|
| BET surface area: | 200-500 m$^2$/g. |

35. A process as claimed in claim 31, wherein in step a) or in step d), when performed before step a), a hydrogel is used which has the following physicochemical properties:

| SiO$_2$ fraction: | 20%-40%, |
|---|---|
| BET surface area: | 250-400 m$^2$/g. |

36. A process as claimed in claim 31, wherein step d) is carried out before step b).

37. A process as claimed in claim 36, wherein the hydrogel in step d) is mixed with 0.2% to 12% by weight of the polymer, based on the hydrogel.

38. A process as claimed in claim 36, wherein the hydrogel in step d) is mixed with 0.5% to 5% by weight of the polymer, based on the hydrogel.

39. A process as claimed in claim 31, wherein the drying in step b) is carried out by means of spray dryers or grinding dryers or pneumatic dryers or spin-flash dryers.

40. A process as claimed in claim 31, wherein step d) is carried out after step b) but before step c).

41. A process as claimed in claim 31, wherein step d) is carried out during step c).

42. A process as claimed in claim 31, wherein the grinding in step c) takes place by means of an air-jet or steam-jet mill or fluidized-bed opposed-jet mill.

43. A process as claimed in claim 31, wherein after the surface-modified silica gel has been dried or after or during the grinding operation particles having a diameter of more than 50 μm are separated off.

44. A coating formulation comprising a surface-modified silica gel as claimed in claim 1.

45. A coating formulation comprising a surface-modified silica gel as claimed in claim 9.

46. A method of preparing matting agents in inks and paints, paper coatings, defoamer formulations, reinforcing agents for silicone rubber or antiblocking agents for plastics, comprising incorporating the surface-modified silica gel as claimed in claim 1 into a matting agent in inks and paints, paper coating, defoamer formulation, reinforcing agent for silicone rubber or antiblocking agent for plastics.

47. A method of preparing matting agents in inks and paints, paper coatings, defoamer formulations, reinforcing agents for silicone rubber or antiblocking agents for plastics, comprising incorporating the surface-modified silica gel as claimed in claim 1 into a matting agent in inks and paints, paper coating, defoamer formulation, reinforcing agent for silicone rubber or antiblocking agent for plastics.

* * * * *